United States Patent
Birdsall

[15] 3,645,507
[45] Feb. 29, 1972

[54] FEED MIXER ATTACHMENT

[72] Inventor: Bert A. Birdsall, Mondamin, Iowa 51557

[22] Filed: Aug. 10, 1970

[21] Appl. No.: 62,394

Related U.S. Application Data

[62] Division of Ser. No. 752,843, Aug. 15, 1968, Pat. No. 3,572,643.

[52] U.S. Cl. ................................. 259/100, 74/97, 74/100, 259/DIG. 31
[51] Int. Cl. ......................................................... B01f 11/04
[58] Field of Search ..................... 259/100, 101, 99, 117, 20, 259/38, 39, 62, 63, DIG. 31; 74/100, 97

[56] References Cited

UNITED STATES PATENTS

| | | | |
|---|---|---|---|
| 461,892 | 10/1891 | Ruthrauff | 259/99 |
| 1,823,637 | 9/1931 | Wright | 259/100 |
| 2,144,345 | 1/1939 | Schlecker | 74/100 |
| 2,229,238 | 1/1941 | Cash | 259/101 |

*Primary Examiner*—Robert W. Jenkins
*Attorney*—Hofgren, Wegner, Allen, Stellman & McCord

[57] ABSTRACT

A material carrier movable over the ground and having automatic cycling feed mixer structure disposable in the container of the carrier to mix material carried therein. This construction includes rockable shafts each having tooth means thereon with structure for rocking the shafts in unison and in opposite directions to reduce forces transmitted to the container.

7 Claims, 1 Drawing Figure

Patented Feb. 29, 1972 3,645,507
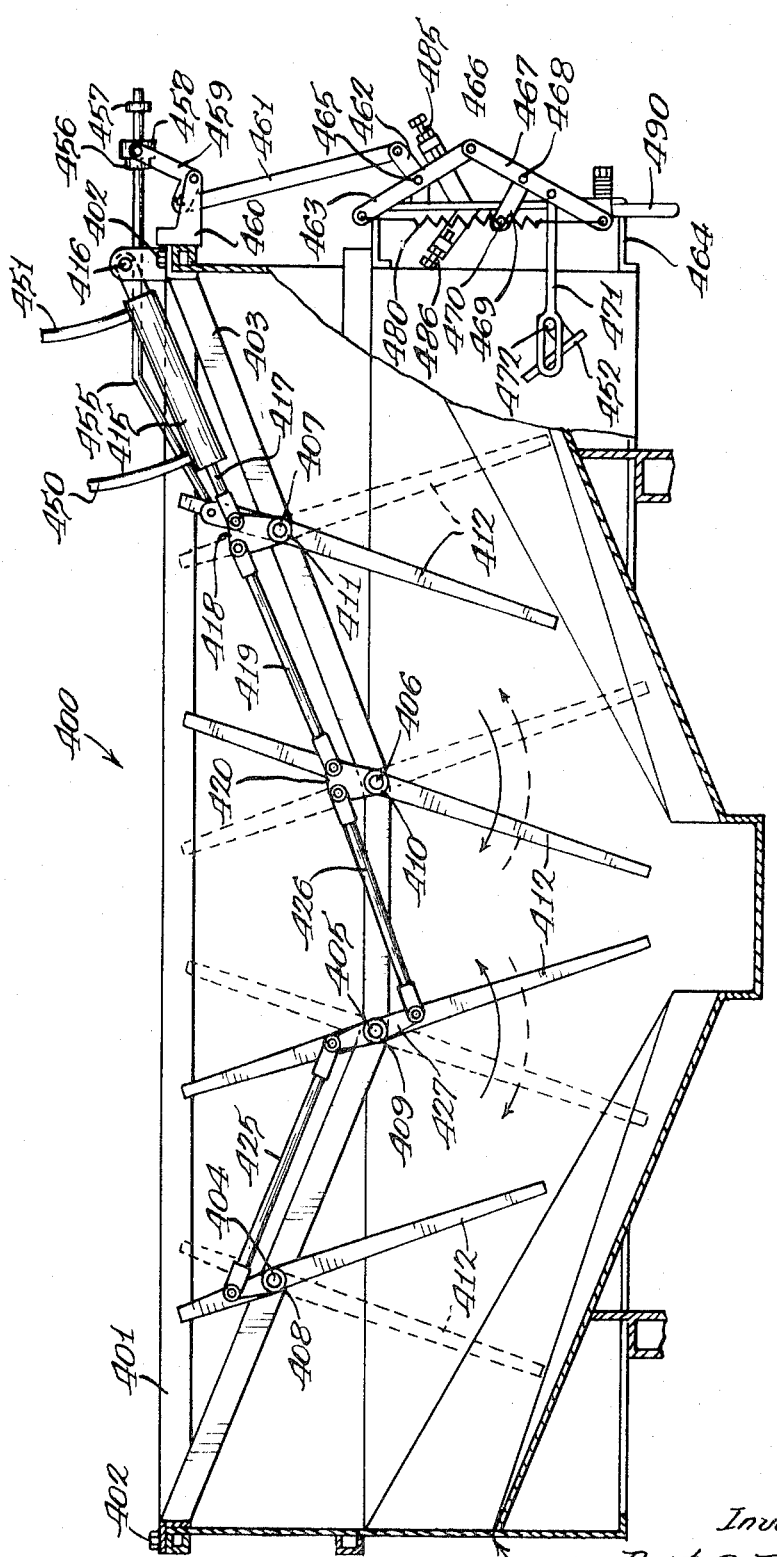
Inventor
Bert A. Birdsall
By Hofgren, Wegner,
Allen, Stellman & McCord
Attys

FEED MIXER ATTACHMENT

CROSS-REFERENCES TO RELATED APPLICATIONS

This application is a division of application Ser. No. 752,843, filed Aug. 15, 1968 now U.S. Pat. No. 3,572,643, and said prior application includes subject matter of application Ser. No. 527,947, filed Feb. 16, 1966, now U.S. Pat. No. 3,412,833.

BACKGROUND OF THE INVENTION

This invention relates to a feed mixer attachment for a material carrier usable about a farm.

SUMMARY OF THE INVENTION

An object of this invention is to provide a new and improved feed mixer attachment for a material carrier.

An additional object of the invention is to provide a material carrier having a container and a feed mixer associated therewith wherein the feed mixer in the form of an attachment comprises at least two generally parallel spaced-apart shafts rockably mounted on a frame of the attachment, tooth means on each shaft and extending downwardly into the container, and means for rocking the shafts in unison with one shaft rocking oppositely to the other to reduce forces transmitted to the container.

Still another object of the invention is to provide a material carrier and feed mixer attachment as described in the preceding paragraph wherein the means for rocking the shafts includes a fluid motor and a control valve with control linkage for the valve being operable by one of said shafts.

BRIEF DESCRIPTION OF THE DRAWING

The drawing is a longitudinal central section taken from front to rear of a material carrier with the feed mixer attachment attached thereto, along with the automatic cycling mechanism therefor.

DESCRIPTION OF THE PREFERRED EMBODIMENT

The feed mixer is shown in the drawing in central section and indicated generally at 400 with mounting thereof in the container 21. A supporting frame 401 overlies and fits around the upper end of the container and can be bolted thereto, as indicated by bolts 402. The feed mixer has identical operating mechanism at each side with that on one side shown in the drawing. This frame has a pair of downwardly sloped side supports, one of which is shown at 403, extending along the interior sides of the container 21 and having a series of spindles 404, 405, 406, and 407 extending therebetween. Each of these spindles mounts a hollow rotatable shaft 408, 409, 410, and 411, with a plurality of mixing teeth 412 extending downwardly from each of the rockable shafts. Mechanism is associated with each of the side frames 403 for causing cyclical oscillatory movement of the mixing teeth, including an hydraulic cylinder 415 connected to the frame 401 by a pin 416 and having a piston rod 417 connected to an arm 418 affixed to the rockable shaft 411. A pivoted link 419 connects the arm 418 to an arm 420 connected to the rockable shaft 410. Thus, the teeth 412 on the shafts 410 and 411 are caused to oscillate simultaneously in the same direction. The rockable shafts 408 and 409 are pivotally connected by a link 425 for simultaneous oscillation in the same direction, with this movement being derived from the arm 420 through a connecting link 426 pivoted between the arm 420 and an arm 427 extending downwardly from the rock shaft 409. With this arrangement, the teeth on the shafts 410 and 411 oscillate in an opposite direction to the teeth on the shafts 408 and 409, to minimize the forces applied to the mixer frame 401 and the container 21. As seen in the drawing, the lower ends of the teeth extend near the bottom of the container to obtain thorough mixing of material.

The feed mixing teeth can automatically be cycled by providing a control for flow of fluid to opposite ends of the cylinders 415 through lines 450 and 451, with the circuit including a control valve at one side of the container having an operating arm 452. The circuit connecting the valve and cylinder can be conventional, with positioning of the valve at opposite extremes reversing the flow of fluid to the cylinders. The reversal of the valve by operation of the arm 452 is accomplished through a control linkage actuated by a link 455 extending from the rock shaft 411 on the spindle 407 having a pair of adjustable collars 456 and 457 thereon which, in their reciprocatory movement, engage an abutment 458 on a bell crank 459 pivoted to an arm 460 on the mixer frame. The bell crank at its opposite end has a downwardly extending link 461 pivoted thereto which pivotally connects at its lower end to an arm 462 extending outwardly from a lever 463 pivoted, intermediate its ends, to a support 464 by a pin 465. The lever 463, at its lower end, is pivoted by a pin 466 to a lever 467 which intermediate its ends is pivotally connected by a pin 468 to an arm 469 pivoted to the support 464 by a pin 470. A slotted link 471 is connected to the lever 467 with the slot therein capturing a pin 472 on the control arm 452 for the control valve. The control linkage is shown in one limit position and with the link 455 moved to the left, bell crank 459 is pivoted counterclockwise to lower the link 461 and pivot the lever 463 about its pivot pin 465 which swings the lever 467 in counterclockwise direction and moves it bodily to carry the interconnecting pivot pin 466 toward the left as viewed in the drawing until the levers 463 and 467 have moved past a straight line position. A snap action in moving past straight line is obtained by the spring 480 which extends between an upper end of the lever 463 and a lower end of a lever 467. In order to limit the extent of movement of the control linkage and prevent damage to the control valve, a pair of threaded adjustable stops 485 and 486 engage the lever 463 in its opposite limit position.

A handle 490 can be operated to place the control linkage in a position to neutralize the controls and prevent oscillation of the feed mixing teeth.

I claim:

1. A material carrier having a container with an open top, a feed mixer associated therewith comprising, a frame attachable to said container, a plurality of generally parallel spaced-apart shafts rockably mounted on said frame, a plurality of teeth on each shaft and extending downwardly into the container, there being at least two pairs of shafts, and means for rocking each pair of shafts in unison with one pair rocking oppositely to the other to reduce forces transmitted to the container.

2. A material carrier as defined in claim 1 wherein said means for rocking said shafts includes an hydraulic motor, a fluid circuit for said motor including a reversible valve, and means for automatically cycling the feed mixer by cycling of said valve including a control linkage connected to the valve and actuated by one of said shafts to reverse the valve by movement of the shaft.

3. A material carrier as defined in claim 2 wherein said control linkage includes a pair of pivotally interconnected links movable to either side of a straight-line relation, spring means connected therebetween to obtain a snap-action in crossing over center, and means for neutralizing the control linkage.

4. A material carrier having a container with an open top, a feed mixer associated therewith comprising, a frame attachable to said container, at least two generally parallel spaced-apart shafts rockably mounted on said frame, tooth means on each shaft and extending downwardly into the container, means for rocking the shafts in unison with one shaft rocking oppositely to the other to reduce forces transmitted to the container, and means for automatically cycling the feed mixer including a fluid motor, a control valve and a control linkage connected to the control valve and actuated by one of said shafts to reverse the valve by movement of the shaft.

5. A control linkage for obtaining cyclic movement of an element operable by a valve controlled fluid motor including a first link, second and third links pivotally connected to each other in end-to-end relation and mounted for movement to either side of a straight-line relation, said first link being connected to one of said second and third links, means causing a snap-action of said second and third links in crossing over center, and means for limiting the extent of movement of said second and third links to positions at either side of said straight-line relation.

6. A control linkage as defined in claim 5 wherein said snap-action means includes a spring connected between said second and third links.

7. A control linkage as defined in claim 6 wherein said second and third links are each pivotally mounted on a pair of floating pivots associated one with each of said second and third links.

* * * * *